Feb. 21, 1967   R. C. JEWELL ET AL   3,305,335
MANUFACTURE OF WIRED GLASS
Filed Feb. 4, 1963   3 Sheets-Sheet 1
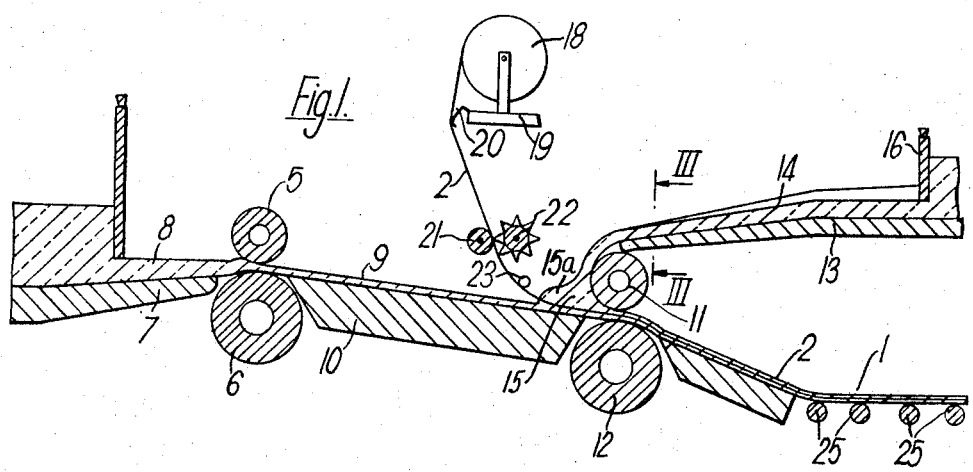
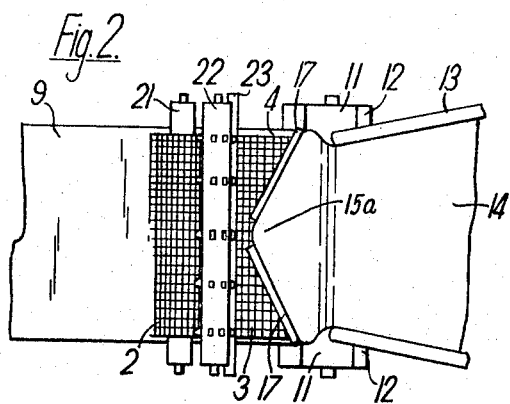
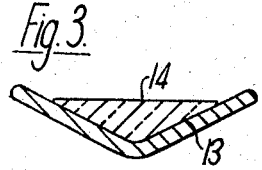
Ronald Colgan Jewell &
Norman Aidan Murphy
Inventors
By Morrison Kennedy & Campbell
Attorneys Feb. 21, 1967    R. C. JEWELL ET AL    3,305,335
MANUFACTURE OF WIRED GLASS
Filed Feb. 4, 1963    3 Sheets-Sheet 2
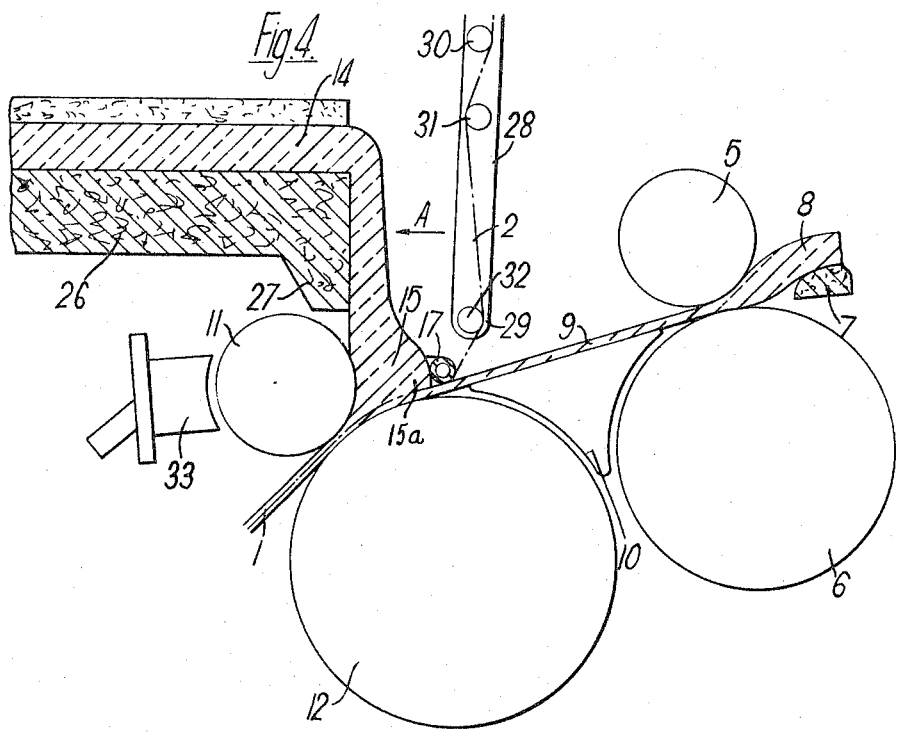
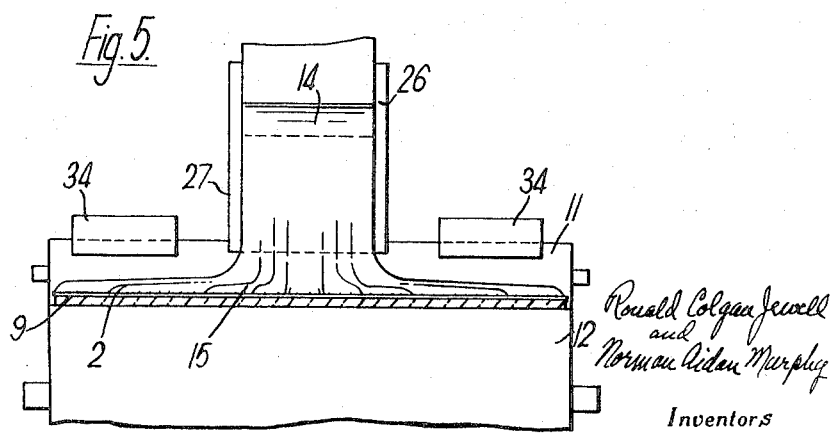
Ronald Colgan Jewell
and
Norman Aidan Murphy
Inventors
By
Morrison Kennedy & Campbell
Attorney

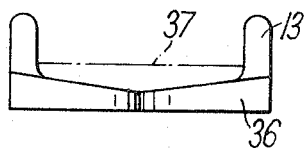
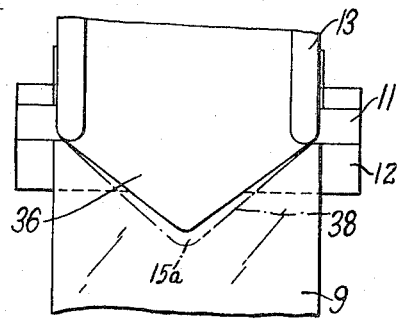
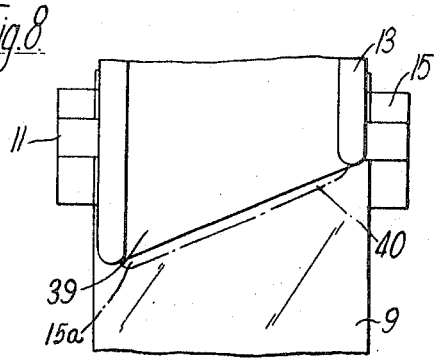

3,305,335
MANUFACTURE OF WIRED GLASS
Ronald Colgan Jewell, Ormskirk, and Norman Aidan Murphy, Woolton, Liverpool, England, assignors to Pilkington Brothers Limited, Liverpool, England, a corporation of Great Britain
Filed Feb. 4, 1963, Ser. No. 255,932
Claims priority, application Great Britain, Feb. 5, 1962, 4,436/62
10 Claims. (Cl. 65—51)

This invention relates to a method and apparatus for continuously manufacturing a ribbon of wired glass in which a wire web consisting of longitudinal and transverse wires welded at their intersections and respectively extending along and across the ribbon is incorporated in the ribbon. Wire web of this kind in which the mesh is rectangular is usually called "Georgian" wire web.

In a known process for the manufacture of a ribbon of wired glass, "Georgian" wire web is fed into molten glass from which the ribbon of glass is formed, and there is a sudden linear expansion of each transverse wire in turn as it becomes completely immersed throughout its length in the molten glass. This expansion is so great that deformation of the transverse wires results. The mesh is unable to take up the strains caused by the sudden expansion of one transverse wire because the adjacent, following, comparatively cold wire remains rigid as does the preceding wire already anchored in the glass.

Usually the deformation of the transverse wires takes the form of a buckling, for example between the longitudinal wires and when the ribbon of wired glass is formed by rolling, the deformed part of the wire is bent backwards to produce in the wired glass an effect known as "feather."

It is a main object of the present invention to provide wired glass in which the buckling of the transverse wires and the production of "feather" is avoided.

According to the invention there is provided a method of continuously manufacturing a ribbon of wired glass in which a wire web consisting of longitudinal and transverse wires welded at their intersections and respectively extending along and across the ribbon is fed into a bolster of molten glass of tapering form from which the ribbon is formed, wherein the transverse wires are heated progressively along their length as the web is fed into the bolster so that the relative expansion between adjacent transverse wires at any time during the heating is so small that it does not cause deformation of the web.

Preferably the heating of each transverse wire begins centrally and the length of each wire so heated is progressively increased as the web is advanced.

Further the invention comprehends a method of continuously manufacturing a ribbon of wired glass in which a wire web consisting of longitudinal and transverse wires welded at their intersections and respectively extending along and across the ribbon is fed into molten glass from which the ribbon is formed, comprising continuously forming a ribbon component of glass, producing on the ribbon component a bolster of molten glass of tapering form in such a way that the ribbon component is advanced towards the narrow end of the bolster, feeding the web into the narrow end of the bolster to heat the transverse wires of the web progressively along their length so that the relative expansion between adjacent transverse wires at any time during the heating is so small that it does not cause deformation of the web, and rolling the ribbon of wired glass from the wider end of the bolster.

In a preferred method according to the invention a V-shaped bolster of molten glass is produced on the ribbon component, which bolster tapers from its centre to its edges in such a way that the ribbon component is advanced towards the apex of the bolster, the web being fed into the apex of the bolster to heat the transverse wires of the web progressively along their length from the centre.

The said bolster of molten glass may be produced by feeding molten glass at a controlled rate on to the surface of the ribbon component, the feed of the glass being confined to the centre of the ribbon component.

Alternatively, the V-shaped bolster of molten glass may be produced by feeding a V-shaped curtain of molten glass at a controlled rate on to the surface of the ribbon component.

From another aspect the invention comprehends that the heating of each transverse wire begins at one end of the wire and each wire is progressively heated from that end as the web is advanced. According to this aspect of the invention the bolster of molten glass may be produced by feeding a laterally inclined straight curtain of molten glass at a controlled rate on to the surface of the ribbon component, so that the front face of the bolster is inclined across the ribbon component.

Further the invention comprehends aiding control of the shape of said bolster by cooled guiding means, and engaging the wire web under said guiding means as the web is fed into the bolster so that the web is cooled and oxidation thereof is minimised.

The invention also comprehends apparatus for continuously manufacturing a ribbon of wired glass in which a wire web consisting of longitudinal and transverse wires welded at their intersections and respectively extending along and across the ribbon is incorporated in the ribbon, comprising means for forming a ribbon of glass including means for forming a bolster of molten glass of tapering form from which the ribbon is formed, and feeding means associated with said ribbon forming means for feeding the web into the bolster in such a way that the transverse wires are heated progressively along their length as the web is fed into the glass so that the relative expansion between adjacent transverse wires at any time during the heating is so small that it does not cause deformation of the web.

A preferred embodiment of apparatus according to the invention comprises a first pair of casting rolls arranged to be fed with molten glass and to cast a ribbon component on to a supporting apron which extends between said first casting rolls and a second pair of casting rolls, and a spout arranged to pour molten glass on to said ribbon component to form said bolster of molten glass in front of the pass between said second rolls, the second pair of casting rolls being operable to roll the ribbon of wired glass from the wider end of the bolster.

The spout may be arranged to pour molten glass over the upper roll of the second pair of rolls, the internal form of the spout being of concave V-section so that the flow of glass over said upper roll is greater at the centre of the rolls, and forms a V-shaped bolster of molten glass on said ribbon component. Control of the shape of the bolster may be aided by adjustable guides mounted over the supporting apron.

Alternatively, according to the invention, the spout may be of rectangular cross-section and extends over a central region of the second rolls to deliver molten glass to a central area of the ribbon component as it is advacned towards said second rolls, to form a V-shaped bolster of molten glass on said ribbon component.

Further according to the invention the axis of the upper roll of said second pair of casting rolls is disposed slightly in advance of the lower roll, and molten glass is delivered on to the central area of the ribbon component where the ribbon component is supported on said lower roll.

Radiant heaters may be mounted above each side of the bolster to assist in maintaining a substantially uniform temperature throughout the bolster.

In a modified apparatus the bottom of the spout has a shallow V-section, and the spout has a V-shaped lip which projects forwardly over the upper roll of said second pair of casting rolls, whereby the molten glass is poured on to the ribbon component as a V-shaped curtain which forms a V-shaped bolster of molten glass on said ribbon component.

Alternatively the spout has a straight lip inclined relative to the direction of travel of the ribbon component and projecting forwardly over the upper roll of said second pair of casting rolls, whereby the molten glass is poured on to the ribbon component as an inclined curtain which forms a bolster of molten glass the front face of which is inclined across the ribbon component.

The invention further provides adjustable guiding means mounted over the supporting apron and arranged to aid control of the shape of the bolster. The guiding means may be in two parts respectively extending inwardly from each side of the bolster or may be a single member extending across the whole width of the wire web as it is fed into the bolster, and from this aspect, said guiding means comprises, according to the invention, at least one water cooled guide member under which the wire web engages as it is fed into the bolster. Excessive heating and oxidation of the wire web is thus prevented or minimised.

The wire web feeding means may include a feed tray through which the web is fed towards the bolster, the lower end of which tray is mounted just in front of the bolster, said tray including a water-cooled guide over which the web passes before it emerges from the tray for feeding into the bolster.

In order that the invention may be more clearly understood some embodiments thereof will now be described, by way of example, with reference to the accompanying diagrammatic drawings in which:

FIGURE 1 is a central sectional elevation of apparatus according to the invention for continuously manufacturing a ribbon of wired glass, FIGURE 2 is a top plan of the apparatus of FIGURE 1, FIGURE 3 is a section on line III—III of FIGURE 1, FIGURE 4 is an elevation, partly in section, of another apparatus according to the invention for continuously manufacturing a ribbon of wired glass, FIGURE 5 is a view in the direction of arrow A in FIGURE 4, FIGURES 6 and 7 illustrate a modified spout for use in the apparatus of FIGURE 4, and FIGURE 8 illustrates another modified spout form.

In the drawings the same reference numbers indicate the same or similar parts.

Referring to FIGURES 1, 2 and 3 of the drawings, a ribbon 1 of wired glass is continuously manufactured according to the invention by forming a ribbon of glass and feeding wire web into the ribbon as it is formed.

The web 2 which is incorporated in the ribbon is illustrated in FIGURE 2, and consists of longitudinal wires 3 and transverse wires 4 welded at their intersections and respectively extending along and across the finished ribbon 1. Wire web of this kind is generally known as "Georgian" wire web.

The ribbon forming means includes a first pair of casting rolls 5 and 6 which are mounted in front of a forehearth 7 which feeds molten glass 8 to the pass between the rolls 5 and 6. The casting rolls 5 and 6 cast a ribbon component 9 of glass on to a supporting apron 10 which extends between the casting rolls 5 and 6 and a second pair of casting rolls 11 and 12.

Above the upper roll 11 of the second pair of rolls is the lip of a spout 13 which extends from a tank of molten glass of the same composition to the glass fed on to the forehearth 7, and the spout 13 is arranged to pour molten glass 14 over the upper roll 11 to form on the ribbon component 9 in front of the pass between the rolls 11 and 12, a V-shaped bolster 15 of molten glass of tapering form having converging sides defining an apex 15a at one end of the bolster.

As shown in FIGURE 3 the internal form of the spout 13 is a concave V-section so that the flow of molten glass over the roll 11 is greatest at the centre of the roll and gradually decreases towards the ends of the roll 11, and the flow down the spout can be so regulated by the tweel 16 that the required V-shaped bolster 15 is produced extending across the ribbon component 9. In order to aid control of the converging sides of the bolster 15 adjustable water-cooled metal guides 17 of material, which is not wetted by the glass, for example stainless steel, are provided. The guides 17 are mounted in a structure supported by the apron 10.

The wire web 2 engages under the guides 17 as the web is fed into the bolster. These guides 17 have an additional function in that they prevent excessive heating of the wire web 2 as it is fed into the bolster 15, thereby preventing or minimising oxidation of the wire web. From this aspect the guides 17 may be joined at the apex 15a of the bolster to form an integral V-shaped member extending across the whole width of the wire web 2.

The wire web 2 which is to be incorporated in the ribbon of glass 1 is fed from a roll 18 which is mounted above the supporting apron 10 on a platform 19, and the web passes over a guide 20 fixed to the edge of the platform 19. The web feeding means also includes a pressure roll 21 and a co-operating pegged feed roll 22. The pegs on the roll 22 are so spaced around its periphery that each peg engages a transverse wire 4 thereby controlling the feed of the web 2.

Also the co-operation of the pegged feed roll 22 with the web maintains the longitudinal wires of the web in position against the water-cooled guide bars 23.

The rolls 21 and 22, the guide bar 23 and the guide 17 are so arranged that the web 2 is fed into the apex end 15a of the bolster 15. The heating of each transverse wire 4 in the bolster 15 begins centrally of the wire, and the transverse wires are heated progressively along their length as the mesh is advanced. Thus the relative expansion between adjacent transverse wires 4 at any time during the heating of the mesh 2 as it enters the bolster 15 is so small that it does not cause deformation of the wires 4 of the web 2, and the production of "feather" is avoided.

The finished ribbon 1 of wired glass is rolled from the wider end of the bolster 15 by the rolls 11 and 12 on to a second supporting apron 24 and is carried to an annealing lehr, not shown, on conveyor rollers 25.

An alternative arrangement according to the invention for manufacturing a ribbon of wired glass is illustrated in FIGURES 4 and 5. In this arrangement a spout 26 of rectangular cross-section extends over a central region of the second casting rolls 11 and 12 to deliver molten glass directly on to the central area of the ribbon component 9 as it is advanced towards said second rolls 11 and 12. As is shown in FIGURE 5 the width of the rectangular spout 26 is such that it extends only over the central region of the rolls. The upper roll 11 is disposed slightly in advance of the lower roll 12, and the spout 26 has a lip 27 which is so positioned that molten glass is delivered down the lip on to a central area of moving ribbon component 9, and the glass flows outwardly to form a V-shaped bolster of molten glass 15 on the ribbon component 9 where it is supported on the lower roll 12. The rate at which molten glass is delivered from the spout 26 is controlled so that the sides of the bolster 15 just reach the edges of the ribbon component 9. Control of the shape of the bolster 15 is aided by a water-cooled V-shaped guide member 17 which extends across the whole width of the web 2.

The wire web 2 is fed to the bolster 15 in this embodiment through a feed tray 28, the lower end 29 of which is mounted just in front of the apex of the bolster 15. The web, as it is fed through the tray 28, passes over the guides 30 and 31 and finally over a water-cooled guide 32 at the lower end 29 of the tray before the web 2 emerges from the tray and engages under the guide 17 as it is fed into the bolster. As shown in FIGURE 4 the web 2 is fed into the bolster 15 at the junction of the molten glass of the bolster with the ribbon component 9 so that the web 2 lies on the upper surface of the ribbon component 9. The rolls 11 and 12 roll the ribbon 1 of wired glass from the wider end of the bolster 15.

A cooler 33 is mounted adjacent the upper roll 11 to prevent the central area of this roll 11 from becoming overheated. The centre of the bolster 15 tends to be hotter than its ends and in order to ensure thermal uniformity along the length of the bolster, radiant heaters 34 are supported over the ends of the bolster. The heaters 34 assist in maintaining the temperature of the bolster ends substantially the same as that of the centre of the bolster.

An alternative way of forming a V-shaped bolster of molten glass on the ribbon component is illustrated in FIGURES 6 and 7. In this construction the spout 13 has a V-shaped lip 36 which projects forwardly over the upper roll 11 of the second pair of casting rolls.

As shown in FIGURE 7 the bottom floor of the spout 13 has a shallow V-section so that the flow of molten glass along the spout is greater at the centre and over the tip of the V-shaped lip 36 than it is at the sides. The level of molten glass in the spout 13 is indicated at 37. The result is that a V-shaped curtain of molten glass is poured over the edge of the V-shaped lip as indicated at 38 in FIGURE 6. This V-shaped curtain forms the V-shaped bolster of molten glass on the ribbon component from the curtain to the upper roll 11. The wire web 2 is fed into the apex of the V-shaped bolster formed in this way, in the same way as illustrated in FIGURE 4.

In another embodiment of the invention, the bolster of molten glass of tapering form may take the form of a laterally inclined bolster the front face of which is inclined across the ribbon component 9 so that the narrow end of the bolster is at one side of the ribbon component. In order to form such a bolster the construction illustrated in FIGURE 8 may be employed, and in this construction the spout 13 has a straight lip 39 inclined relative to the direction of travel of the ribbon component 9 and projecting forwardly over the upper roll 11 of the second pair of casting rolls.

Molten glass is poured from the spout 13 on to the ribbon component as an inclined curtain indicated at 40 in FIGURE 8 which forms on the ribbon component 9 a bolster of molten glass which extends from the inclined curtain 40 to the upper roll 11 of the second pair of casting rolls.

In the construction of FIGURE 8 the wire web 2 is fed into the narrow end of the bolster in the same way as illustrated in FIGURE 4, so that the progressive heating of each transverse wire of the web begins at one end of the wire and each transverse wire is progressively heated from that end as the web 2 is advanced.

When the flat ribbon 1 has been annealed it may be finished by grinding and polishing the surfaces of the ribbon to remove surface imperfections. Alternatively, surface imperfections on the ribbon may be removed by treating the hot ribbon on a bath of molten metal as described in United States Patent No. 2,911,759.

Although the invention has been described above with reference to the production of flat glass, the invention also comprehends the processing of the ribbon of wired glass after it leaves the second pair of casting rolls 11 and 12. For example, the ribbon 1 may be passed through shaping means before it stiffens to produce a corrugated ribbon of wired glass.

Patterned wire glass can also be produced according to the invention by employing patterned casting rolls 11 and 12 in the illustrated embodiments.

The invention also comprehends a ribbon of wired glass produced by a method as described above and in which "feather" has been avoided, sheets of wired glass cut from the ribbon, and articles made up from such sheets.

We claim:
1. A method of continuously manufacturing a ribbon of wired glass incorporating a wire web consisting of longitudinal and transverse wires welded at their intersections and respectively extending along and across the ribbon, comprising continuously forming and maintaining a bolster of molten glass with converging sides defining an apex at one end of the bolster, whereby the width of the bolster between these sides increases progressively from said apex to the other wider end of the bolster, feeding said wire web longitudinally into said bolster in a direction to cause the transverse wires to enter said bolster through a region near said apex end with said transverse wires extending across said converging bolster sides, whereby the transverse wires are heated progressively along their length by the molten glass as the web is fed into the bolster and the relative expansion between adjacent transverse wires at any time during the heating is so small that it does not cause substantial deformation of the web, and rolling a ribbon of wired glass from the wider end of the bolster.

2. A method according to claim 1, comprising forming the bolster of molten glass as a V-shaped bolster whose sides converge inwardly to the centrally disposed apex of the bolster, so that the heating of each transverse wire of the wire web begins centrally as it enters the bolster.

3. A method according to claim 1, comprising continuously forming a ribbon component of glass and then continuously maintaining said bolster of molten glass with converging sides on the ribbon component.

4. A method according to claim 3, comprising continuously feeding downwardly and at a controlled rate on to the surface of the ribbon component, a V-shaped curtain of molten glass whose sides converge inwardly to a centrally disposed apex thereby maintaining a V-shaped bolster of molten glass on the ribbon component.

5. A method according to claim 3, comprising continuously feeding downwardly and at a controlled rate on to the surface of the ribbon component a laterally inclined straight curtain of molten glass in order to maintain on the ribbon component a bolster of molten glass whose apex lies at one side of the ribbon component and whose front face is inclined across the ribbon component.

6. Apparatus for continuously manufacturing a ribbon of wired glass incorporating a wire web consisting of longitudinal and transverse wires welded at their intersections and respectively extending along and across the ribbon, comprising a supporting surface for molten glass, ribbon forming means associated with said surface for forming a ribbon of glass from molten glass supported by the surface, molten glass supply means mounted above the ribbon forming means for pouring molten glass towards the supporting surface to form a bolster of molten glass in front of the ribbon forming means, said supply means including bolster shaping means for so shaping the bolster that the free front edge of the bolster tapers to an apex pointing away from the ribbon forming means, and wire web feeding means so mounted relative to the ribbon forming means that the wire web is fed into the apex of the bolster and the transverse wires of the web are heated progressively along their length by the molten glass as the web is fed into the bolster.

7. Apparatus according to claim 6, comprising a first pair of casting rolls, means arranged to feed said first casting rolls with molten glass, a supporting apron which extends from said first casting rolls to receive a ribbon component cast thereby, a second pair of casting rolls located at the other end of the supporting apron, said supply means comprising a spout arranged above the second casting rolls to pour molten glass on to said ribbon component, said spout being so shaped as to form said tapered bolster of molten glass in front of the pass between said second rolls with the apex of the bolster pointing towards the first casting rolls, the second pair of casting rolls being arranged to roll the ribbon of wired glass from the wider end of the bolster.

8. Apparatus according to claim 7, wherein the spout is arranged to pour molten glass over the upper roll of the second pair of rolls, and the internal form of the spout is of concave V-section so that the flow of glass over said upper roller is greater at the center of the rolls.

9. Apparatus according to claim 7, wherein the spout is of rectangular cross-section and extends only over the central region of the second rolls to deliver molten glass only to a central area of the ribbon component, as said ribbon component is advanced towards said second rolls.

10. Apparatus according to claim 7, wherein the spout has a pouring lip projecting forwardly over the upper roll of said second pair of casting rolls, and inclined relative to the direction of travel of the ribbon component towards an apex, whereby the molten glass is poured onto the ribbon component as a curtain with substantially corresponding inclination to form said tapered bolster.

References Cited by the Examiner
UNITED STATES PATENTS

| | | | |
|---|---|---|---|
| 945,314 | 1/1910 | Franzen | 65—52 X |
| 1,608,644 | 11/1926 | Black | 65—185 |
| 1,891,116 | 12/1932 | Smith | 65—52 |
| 1,935,583 | 11/1933 | Thurn | 65—51 X |

DONALL H. SYLVESTER, *Primary Examiner.*

R. LINDSAY, *Assistant Examiner.*